(12) United States Patent
O'Neill

(10) Patent No.: US 10,749,195 B2
(45) Date of Patent: Aug. 18, 2020

(54) ELECTROCHEMICAL CELL AND METHOD OF OPERATION

(71) Applicant: Hamilton Sundstrand Corporation, Charlotte, NC (US)

(72) Inventor: Jonathan Daniel O'Neill, Manchester, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 225 days.

(21) Appl. No.: 16/031,576

(22) Filed: Jul. 10, 2018

(65) Prior Publication Data

US 2018/0323456 A1 Nov. 8, 2018

Related U.S. Application Data

(62) Division of application No. 14/997,837, filed on Jan. 18, 2016, now Pat. No. 10,109,873.

(51) Int. Cl.
| | |
|---|---|
| *H01M 8/04* | (2016.01) |
| *H01M 8/04992* | (2016.01) |
| *H01M 8/18* | (2006.01) |
| *H01M 8/02* | (2016.01) |
| *H01M 8/04858* | (2016.01) |

(Continued)

(52) U.S. Cl.
CPC ..... *H01M 8/04992* (2013.01); *H01M 8/0267* (2013.01); *H01M 8/0441* (2013.01); *H01M 8/04134* (2013.01); *H01M 8/04395* (2013.01); *H01M 8/04417* (2013.01); *H01M 8/04552* (2013.01); *H01M 8/04582* (2013.01); *H01M 8/04611* (2013.01); *H01M 8/04753* (2013.01); *H01M 8/04768* (2013.01);

(Continued)

(58) Field of Classification Search
CPC ...... H01M 8/04; H01M 8/18; H01M 8/04537; H01M 8/04858; H01M 8/12
See application file for complete search history.

(56) References Cited

U.S. PATENT DOCUMENTS

| | | | |
|---|---|---|---|
| 5,853,909 A | 12/1998 | Reiser | |
| 6,376,111 B1* | 4/2002 | Mathias | H01M 8/04126 429/413 |

(Continued)

FOREIGN PATENT DOCUMENTS

EP    0835531 A1    4/1998

OTHER PUBLICATIONS

Extended European search report for Application No. 17150951.6 dated Apr. 21, 2017; 10 pgs.

*Primary Examiner* — Kenneth J Douyette
(74) *Attorney, Agent, or Firm* — Cantor Colburn LLP

(57) ABSTRACT

An electrochemical cell system and a method for operating an electrochemical cell is provided. The method including determining one of a power level, current level or a voltage level of the electrochemical cell, the electrochemical cell including at least one cell having an anode side and a cathode side, the electrochemical cell further having a water transport plate operably coupled to the cathode side. An oxidant pressure level is determined in the cathode side. A water pressure level is determined in the water transport plate. The active area of the at least one cell is changed by adjusting at least one of the oxidant pressure level or the water pressure level based at least in part on the determined power level, current level or voltage level.

7 Claims, 7 Drawing Sheets

(51) Int. Cl.
  *H01M 8/0267* (2016.01)
  *H01M 8/04119* (2016.01)
  *H01M 8/0438* (2016.01)
  *H01M 8/04746* (2016.01)
  *H01M 8/04537* (2016.01)
  *H01M 8/0234* (2016.01)
  *H01M 8/1018* (2016.01)

(52) U.S. Cl.
  CPC ....... *H01M 8/04873* (2013.01); *H01M 8/186* (2013.01); *H01M 8/0234* (2013.01); *H01M 2008/1095* (2013.01)

(56) References Cited

U.S. PATENT DOCUMENTS

| | | |
|---|---|---|
| 6,379,827 B1 | 4/2002 | Cipollini |
| 2009/0130500 A1 | 5/2009 | Wozniczka |
| 2010/0167152 A1* | 7/2010 | Hocho .............. H01M 8/04097 429/444 |
| 2012/0270126 A1 | 10/2012 | Matsumoto |
| 2014/0220468 A1 | 8/2014 | Lang et al. |
| 2014/0356748 A1 | 12/2014 | Yamazaki et al. |
| 2015/0207159 A1 | 7/2015 | Matsusue |
| 2017/0207470 A1 | 7/2017 | O'Neill |

* cited by examiner

ELECTROCHEMICAL CELL AND METHOD OF OPERATION

CROSS REFERENCE TO RELATED APPLICATIONS

This application is a divisional application of U.S. Non-Provisional application Ser. No. 14/997,837, filed Jan. 18, 2016, now U.S. Pat. No. 10,109,873, the entire disclosure of which is incorporated herein by reference.

BACKGROUND

The present disclosure relates generally to electrochemical cells, and in particular to fuel cells having water transport plates.

A typical fuel cell uses the general configuration as is shown in FIG. 1. Hydrogen gas 102 is introduced to the hydrogen electrode (the anode 116), while oxygen, or an oxidant/oxygen-containing gas such as air 104, is introduced to the oxygen electrode (the cathode 114). Water can also be introduced with the hydrogen feed gas 102, such as by humidifying the gas stream. The hydrogen gas for fuel cell operation can originate from a pure hydrogen source, hydrocarbon, methanol, or any other hydrogen source that supplies hydrogen at purity suitable for fuel cell operation (i.e., a purity that does not poison the catalyst or interfere with cell operation). Hydrogen gas 102 electrochemically reacts at the anode 116 to produce protons and electrons, wherein the electrons flow from the anode through an electrically connected external load 120, and the protons migrate through the membrane 118 to the cathode 114. At the cathode 114, the protons and electrons react with oxygen to form water, which additionally includes any water that is dragged through the membrane 118 to the cathode 114. The electrical potential across the anode 116 and the cathode 114 can be exploited to power an external load 120.

In other embodiments, one or more electrochemical cells may be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode-assembly", or "MEA") typically has a first flow field in fluid communication with the cathode and a second flow field in fluid communication with the anode.

The cells of the stack may be separated by a plate, sometimes referred to as a bipolar plate. The bipolar plate allows for the conduction of electrical current between the cells and in some cases incorporates features, referred to as flow fields that facilitate the movement of fluids within the electrochemical cell system. In some systems, the bipolar plate may incorporate channels that allow for the flow of a coolant (e.g. water) to remove heat from the cells.

BRIEF DESCRIPTION

In accordance with an embodiment, a method for operating an electrochemical cell is provided. The method of operating an electrochemical cell includes determining one of a power level, current level or a voltage level of the electrochemical cell, the electrochemical cell including at least one cell having an anode side and a cathode side, the electrochemical cell further having a water transport plate operably coupled to the cathode side. An oxidant pressure level is determined in the cathode side. A water pressure level is determined in the water transport plate. The active area of the at least one cell is changed by adjusting at least one of the oxidant pressure level or the water pressure level based at least in part on the determined power level, current level or voltage level.

In accordance with another embodiment, an electrochemical cell system is provided. The system including a memory having computer readable instructions and one or more processors for executing the computer readable instructions. The computer readable instructions include determining one of a power level, current level or voltage level of the electrochemical cell, the electrochemical cell including at least one cell having an anode side and a cathode side, the electrochemical cell further having a water transport plate operably coupled to the cathode side. An oxidant pressure level is determined in the cathode side. A water pressure level is determined in the water transport plate. The active area of the at least one cell is changed by adjusting at least one of the oxidant pressure level or the water pressure level based at least in part on the determined power level, current level or voltage level.

In accordance with still another embodiment, an electrochemical cell system is provided. The electrochemical cell having at least one cell having an anode side configured to receive a gas containing hydrogen and a cathode side configured to receive an oxidant, the hydrogen gas being at a first pressure and the oxidant being at a second pressure. A water transport plate is operably coupled to the cathode side, the water transport plate being made from a microporous material and having a water channel extending therethrough and configured to receive water at a third pressure. A controller configured to perform: determining one of a power level, current level or a voltage level of the electrochemical cell, the electrochemical cell including at least one cell having an anode side and a cathode side, the electrochemical cell further having a water transport plate operably coupled to the cathode side; determining an oxidant pressure level in the cathode side; determining a water pressure level in the water transport plate; and changing the active area of the at least one cell by adjusting at least one of the oxidant pressure level or the water pressure level based at least in part on the determined power level, current level or voltage level.

BRIEF DESCRIPTION OF THE DRAWINGS

Referring to the exemplary drawings wherein like elements are numbered alike in the accompanying Figures.

DETAILED DESCRIPTION

Embodiments of the invention provide for an electrochemical system, such as a fuel cell for example, that may be configured to operate at lower voltages under low power conditions and higher voltages at higher conditions.

Figure 1:
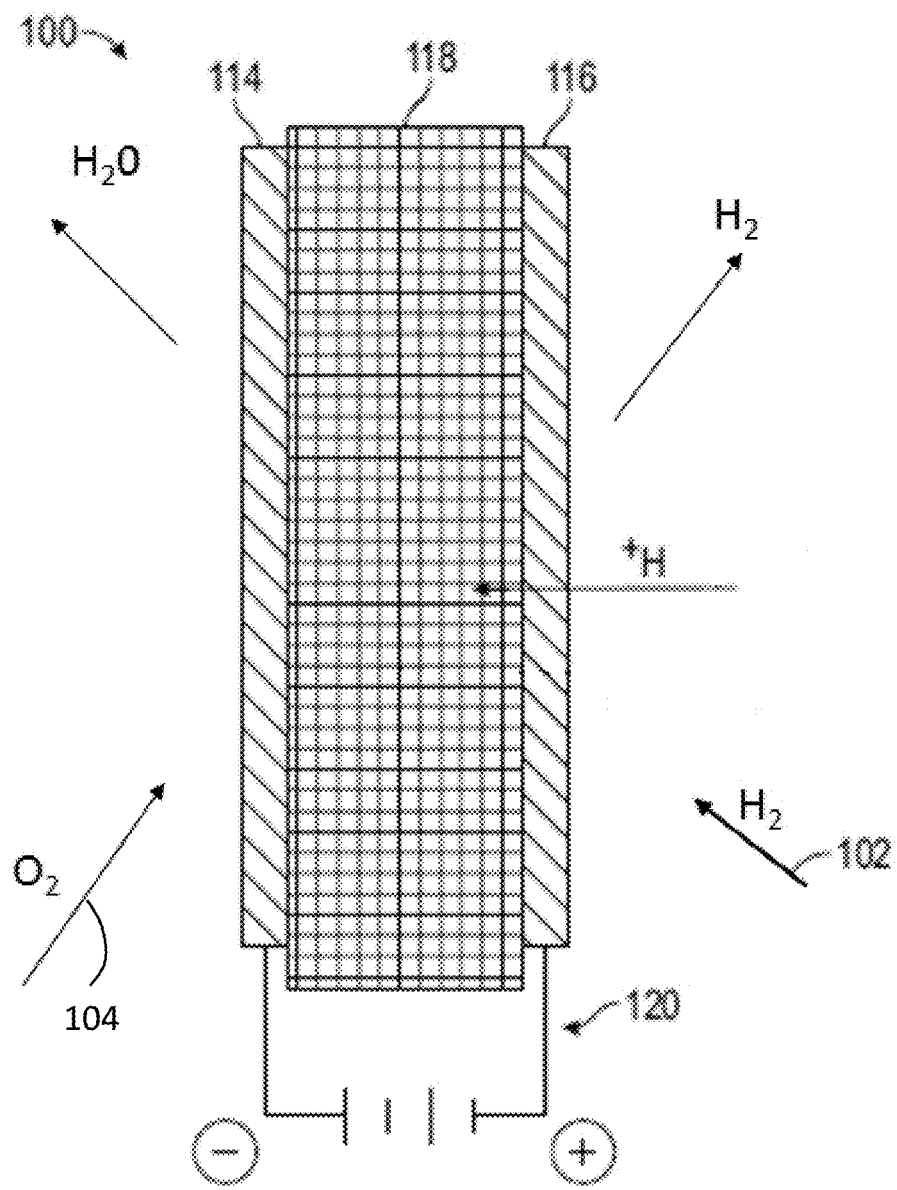
FIG. 1 illustrates a schematic diagram of a partial electrochemical cell showing an electrochemical reaction for use in accordance with embodiments of the invention.
Figure 2:
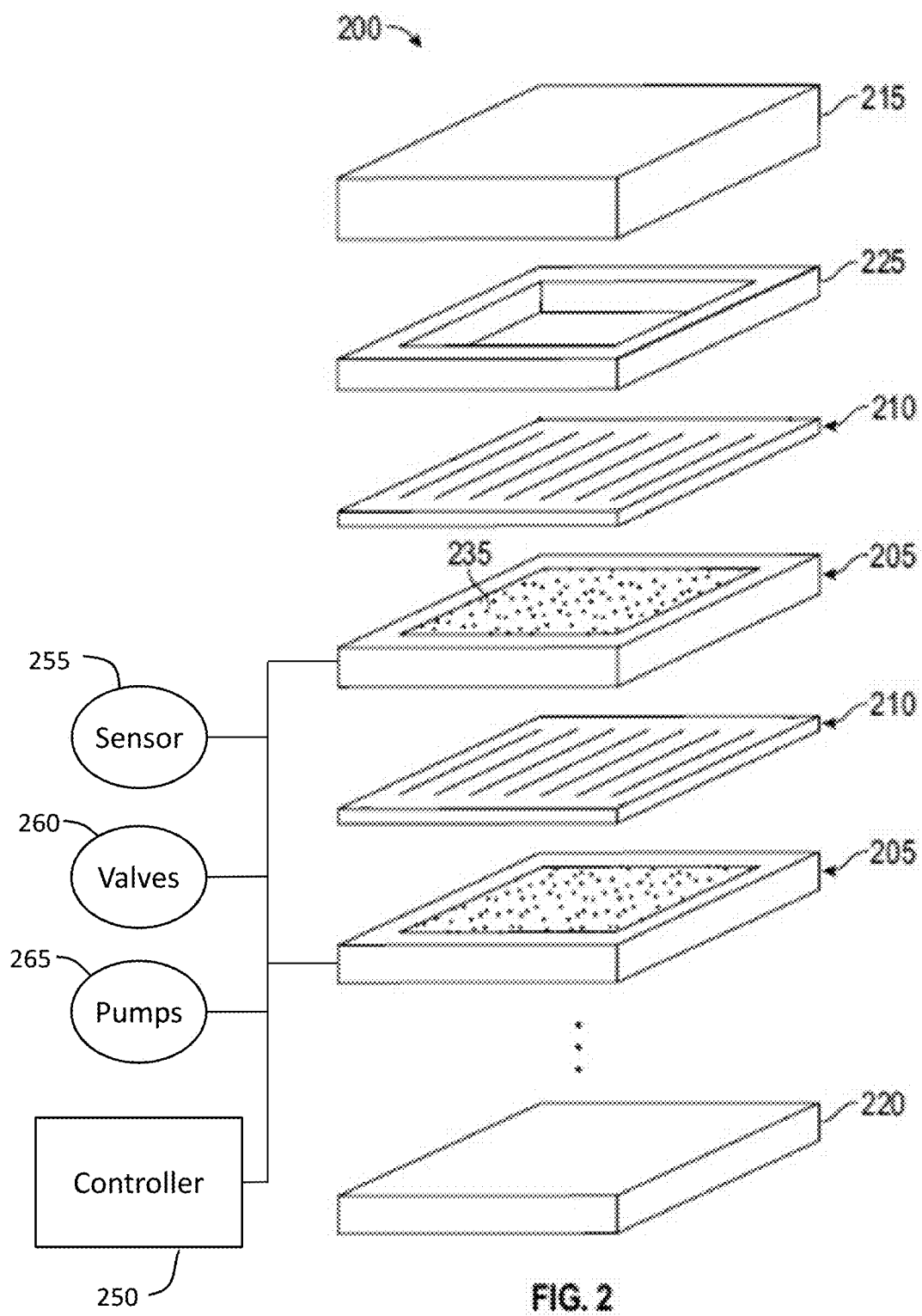
FIG. 2 illustrates an exploded assembly isometric view of an exemplary electrochemical cell of FIG. 1 in accordance with some embodiments of the invention.
Figure 3:
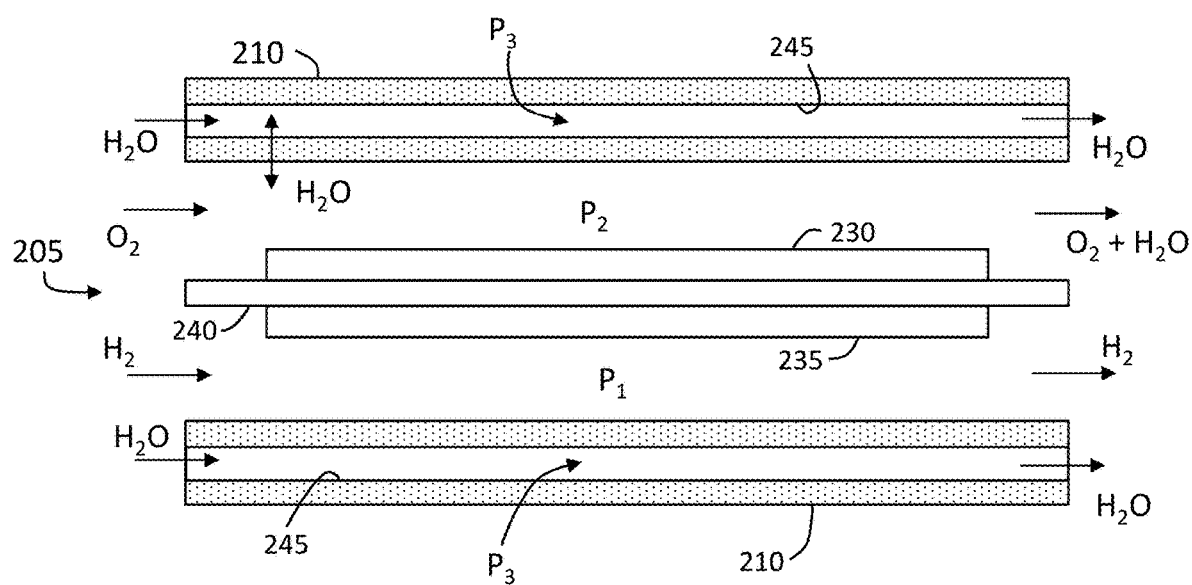
FIG. 3 illustrates an exploded side view of a single cell of the electrochemical assembly of FIG. 1 in accordance with some embodiments of the invention.

Referring first to FIGS. 2 and 3, an exemplary electrochemical cell 200 that may be suitable for operation as fuel cell, is depicted in an exploded assembly isometric view. Cell 200 is typically one of a plurality of cells arranged in a cell stack as part of an electrochemical cell system. The number of cells within the stack, and the dimensions of the individual cells is scalable to the desired cell electrical power output. Accordingly, application of electrochemical cell 200 may involve a plurality of individual cells 200 arranged electrically either in series or parallel depending on the application. Cells 200 may be operated at a range of pressures by varying the inlet pressures of the hydrogen and oxidant gas streams. As will be discussed in more detail herein, by changing the water inlet pressure or oxidant inlet pressure, the operation of the electrochemical cell 200 may be changed to desired parameters.

In an embodiment, cell 200 includes a plurality of membrane-electrode-assemblies (MEAs) 205 alternatively arranged with a plurality of bipolar plates 210 between a first cell separator plate 215 and a second cell separator plate 220. While FIG. 2 illustrates bipolar plate 210 as a single component, as is discussed in more detail below, the flow field members 210 may be formed from several individual components and may also cooperate with the separator plates 215 and 220 to define fluid flow paths. Gaskets 225 may be employed generally for enhancing the seal between the first and second cell separator plates 215, 220 and the associated bipolar plate 210, and between MEA 205 and an adjacent separator plate 210.

In the exemplary embodiment, the bipolar plates 210 are water transport plates. As used herein, a water transport plate is a plate member having flow channels 245 that receive water at an inlet and transport/flow across the cell to an outlet for cooling the cell 200. The water transport plate is made from a microporous material, such as carbon for example. Under typical operating conditions, the pressures within the anode and cathode sides of the cell 200 are maintained at a pressure level that is greater than the pressure level of the cooling water within the water transport plate. In general the electrochemical cell 200 is operated with a hydrogen pressure $P_1$ greater than the oxygen pressure $P_2$, which is greater than the water pressure $P_3$ in channel 245 ($P_1 > P_2 > P_3$). In this way, water within the cell 200 migrates into the water transport plate and is removed from the system.

MEA 205 has a first electrode (e.g., cathode, or oxygen electrode) 230 and a second electrode (e.g., anode, or hydrogen electrode) 235 disposed on opposite sides of a proton exchange membrane (membrane) 240 (FIG. 3). Bipolar plates 210, which are in fluid communication with electrodes 230 and 235 of an adjacent MEA 205, have a structure that defines the flow fields adjacent to electrodes 230 and 235, and the sealing thereof. The cell components, particularly cell separator plates 215, 220, plates 210, and gaskets 225, may be formed with suitable manifolds or other conduits for fluid flow. In embodiments where a plurality of cells 200 are arranged into an electrochemical cell stack, one of the separator plates 215, 220 may be an end plate for the assembly.

In an embodiment, membrane 240 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 230 and 235 may comprise a catalyst suitable for performing the needed electrochemical reaction. Suitable catalyst include, but are not limited to, materials comprising platinum, palladium, rhodium, carbon, gold, tantalum, tungsten, ruthenium, iridium, osmium, alloys of at least one of the foregoing catalysts, and the like. Electrodes 230 and 235 may be formed on membrane 240, or may be layered adjacent to, but in contact with, membrane 240.

In an embodiment, the electrochemical cell 200 is controlled by controller 250. Controller 250 is a suitable electronic device capable of accepting data and instructions, executing the instructions to process the data, and presenting the results. Controller 250 may accept instructions through user interface, or through other means such as but not limited to electronic data card, voice activation means, manually-operable selection and control means, radiated wavelength and electronic or electrical transfer. Therefore, controller 250 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer or a hybrid of any of the foregoing.

Controller 250 is capable of converting the analog voltage or current level, such as that provided by sensors 255 into a digital signal indicative of the pressure levels of the hydrogen and oxidant gas streams and the cooling water. In an embodiment, sensors 255 may be configured to provide a digital signal to controller 250, or an analog-to-digital (A/D) converter (not shown) maybe coupled between sensor 255 and controller 250 to convert the analog signal provided by sensor 255 into a digital signal for processing by controller 250. Controller 250 uses the digital signals as input to various processes for controlling the electrochemical cell 200. The digital signals may also represent one or more system data including but not limited to hydrogen pressure level, oxygen pressure level, water pressure level, power output, valve 260 operational states, pump 265 operating states and the like.

In general, controller 250 accepts data from sensors 255 and is given certain instructions for the purpose of comparing the data from sensors 255 to predetermined operational parameters. Controller 250 provides operating signals to the valves 260 and pumps 265. Controller 250 may also accept data from electrochemical cell 200, indicating, for example, whether the electrochemical cell is operating in a desired power level, voltage level and pressure range. The controller 250 compares the operational parameters to predetermined variances (e.g. low flow rate, low pressure, precursor material supply inadequate) and determines if the predetermined variance is exceeded. In an embodiment a signal may be generated that may be used to indicate an alarm to an operator or a computer network. Additionally, the signal may initiate other control methods that adapt the operation of the electrochemical cell 200 such as changing the operational state of valves 250 or pumps 260 to compensate for the out of variance operating parameter. As discussed in more detail herein, if sensors 255 detect a drop in power level below a predetermined threshold, the voltage of the cells may be reduced to improve reliability and durability of the electrochemical cell 200.

Figure 4:
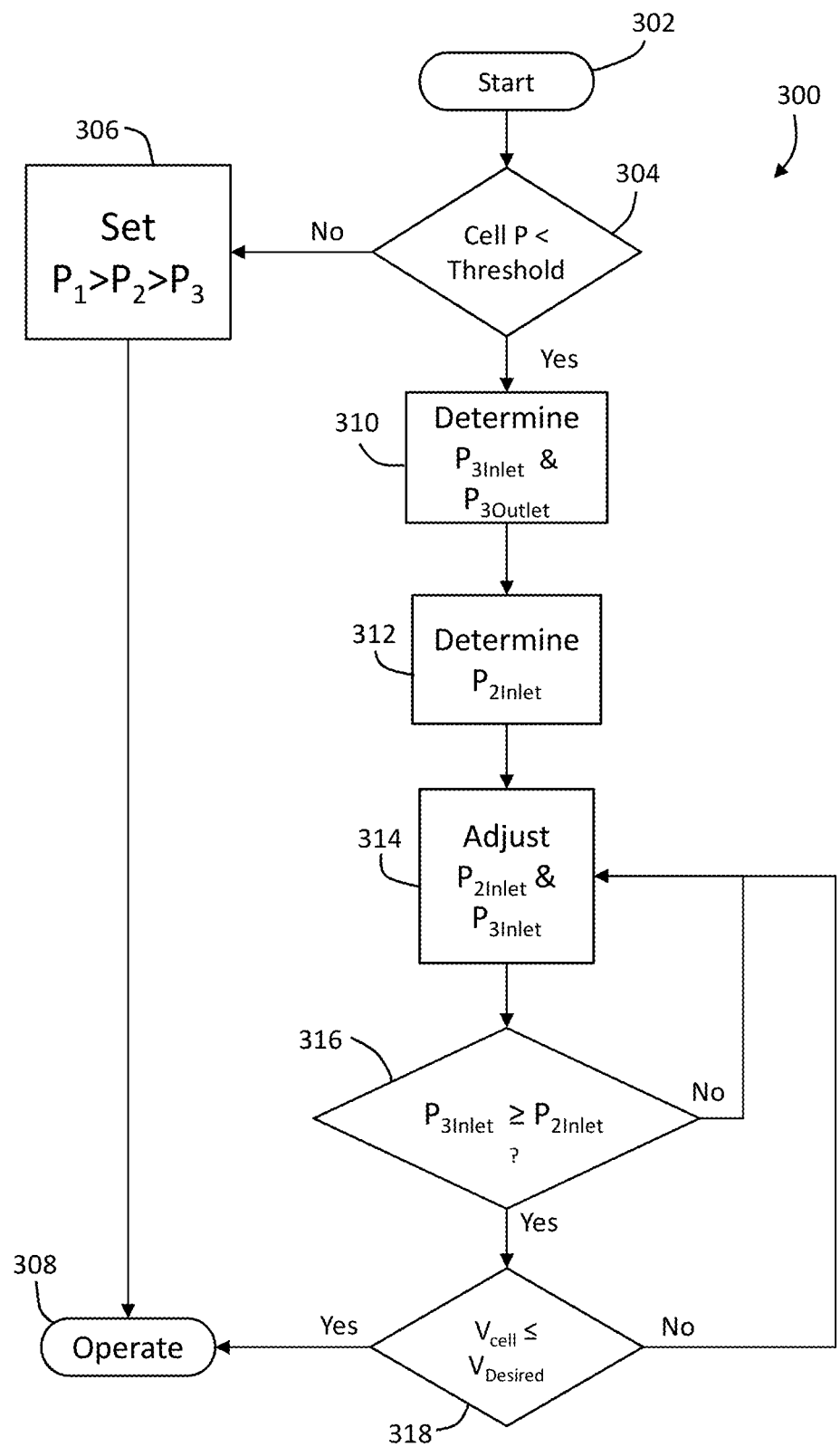
FIG. 4 illustrates a method of operating a fuel cell in accordance with some embodiments of the invention.

Controller 250 includes operation control methods embodied in application code shown in FIG. 4. These methods are embodied in computer instructions written to be executed by a processor and stored in memory, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Referring now to FIG. 4 a method 300 is shown for operating the electrochemical cell 200. The method 300 starts in block 302 and proceeds to query block 304 where it is determined if the power output P of the electrochemical cell 200 is below a threshold. It should be appreciated that when the power output of the electrochemical cell 200 is reduced (such as due to a reduced demand from the load), the voltage of the cells in the electrochemical cell 200 remain relatively high. By way of example, and not intended to be limiting, a higher operating voltage may be greater than or equal to 0.9 volts per cell. It has been found that operating at higher voltages under low power conditions reduces the durability and reliability of the electrochemical cell 200. It should be appreciated that the power level threshold may depend on the size of the electrochemical cell 200.

When the query block 304 returns a positive, meaning the power level P is above the threshold, then the method 300 proceeds to block 306 where the pressure levels of the hydrogen gas stream $P_1$, the oxidant gas stream $P_2$, and the water pressure $P_3$ are set such that $P_1 > P_2 > P_3$. The method 300 then proceeds to block 308 where the electrochemical cell is operated until there is a change in the power levels.

When the query block 304 returns a negative, meaning the power level P has reduced below the threshold, the method 300 proceeds to block 310. In block 310, the pressure level $P_3$ of the water channels 245 is determined. In an embodiment, the pressure level of the water channels 245 at the inlet ($P_{3inlet}$) and the outlet ($P_{3outlet}$) are measured to determine the pressure drop as the water flows across the plates 210. The method 300 then proceeds to block 312 where the oxidant pressure $P_2$ of the cathode side of the cell is determined. In an embodiment, the oxidant pressure level at the inlet ($P_{2inlet}$) is determined. In an embodiment the oxidant pressure level $P_{2inlet}$ remains relatively constant (e.g. very small to negligible pressure drop) as the oxidant flows across the cell. It should be appreciated that in an embodiment, the oxidant pressure level P2 and the water pressure level P3 may be determined at locations other than the cell, such as the inlet to the electrochemical cell 200 for example, and the pressure levels at the cells determined based on a pre-determined characterization of the electrochemical cells.

The method 300 then proceeds to block 314 where the oxidant inlet pressure $P_{2Inlet}$ and the water channel inlet pressure $P_{3Inlet}$ are adjusted to be approximately equal. By adjusting the pressures to be approximately equal, it should be appreciated that water will not migrate from the cathode side of the cell into the plate 210. Rather, some water may flow out of the plate 210 into the cathode side of the cell. As a result, a condition commonly referred to as "flooding" may occur in portions of the cell. The effect of flooding is to reduce the active area of the electrode 230, in other words the presence of water in the cell prevents the oxygen from reacting with the hydrogen protons at the electrode. This reduction in the active area further increases the current density of each cell and reduces the cell voltage.

It should further be appreciated that since the pressure drop of the water across the channel 245 is larger than the pressure drop of the oxidant across the cathode, the amount of flooding will be larger near the inlet and reduced or not occur near the outlet of the cathode. Thus, by controlling the relative pressures of the oxidant and the cooling water, the amount of flooding may be changed to achieve the desired size of the active area and cell voltage. In an embodiment, the water inlet pressure $P_{3Inlet}$ is adjusted to be greater than the inlet pressure $P_{2Inlet}$ of the oxidant. The method 300 then proceeds to query block 316 where it is determined if the water inlet pressure $P_{3Inlet}$ is greater than or equal to the inlet pressure $P_{2Inlet}$ of the oxidant. When query block 316 returns a negative, the method 300 loops back to block 314 and the pressures $P_{3Inlet}$, $P_{2Inlet}$ are once again adjusted. When query block 316 returns a positive, the method 300 proceeds to query block 318 where it is determined if the cell voltage is less than or equal to a desired cell voltage. It should be appreciated that a lower cell voltage results in a reduction in operating efficiency. As a result, additional thermal energy will be generated with operating at lower cell voltages, which may provide advantages in maintaining a desired temperature of the cell 200. When query block 318 returns a negative, the method 300 loops back to block 314 and the pressures $P_{3Inlet}$, $P_{2Inlet}$ are once again adjusted. In an embodiment, the outlet pressure of the water channel $P_{3Outlet}$ is also determined. In this embodiment, the pressures may be configured such that $P_{3Inlet} \geq P_{2Inlet} \geq P_{3Outlet}$. This avoids flooding the entire cathode side of the cell.

When query block 318 returns a positive, the method 300 proceeds to block 308 where the electrochemical cell 200 is operated under a low power and low cell voltage condition. In an embodiment, the threshold for the desired voltage is 0.8 volts per cell.

It should be appreciated that when a demand for electrical power increases, the process may be reversed to once again migrate water out of the cathode and into the plate 210. The reduction in water within the cathode increases the active area and also increases the cell voltage to a desired level.

Figure 5:
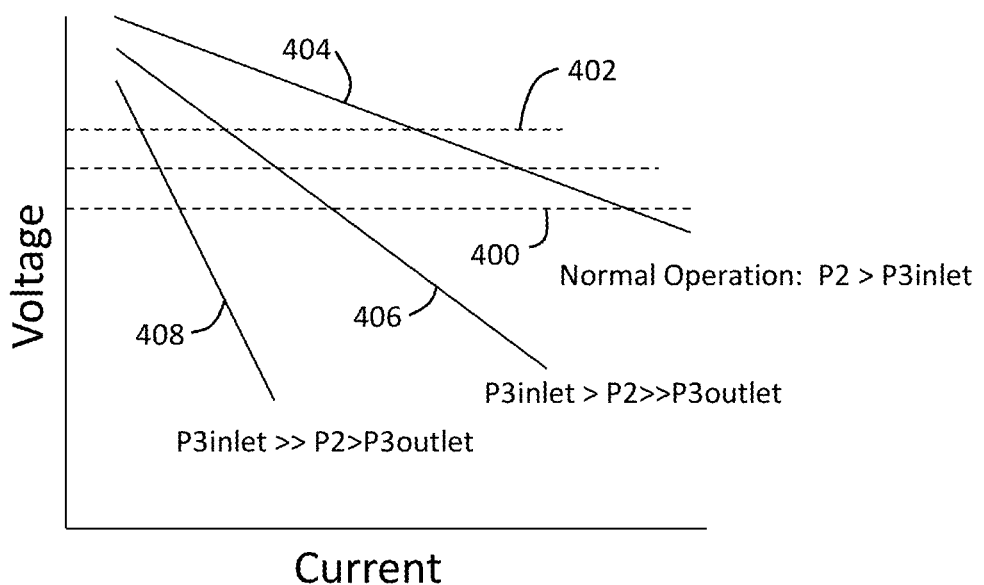
FIG. 5, FIG. 6 and FIG. 7 illustrate graphical representations of operating states for the fuel cell of FIG. 1.

In other embodiments, the method 300 may be performed by monitoring the voltage rather than the power output of the fuel cell. Turning to FIG. 5, an embodiment is shown where the fuel cell is operated between a lower threshold 400 and an upper threshold 402 along three operating curves 404, 406, 408 as shown in FIG. 5. In an embodiment, the thresholds 400, 402 represent the desired operating bounds by the operator to maintain a desired durability (at least partially defined by the upper threshold) and efficiency (at least partially defined by the lower threshold. Under normal operating conditions curve 404, $P_2 > P_{3Inlet}$, in other words an unflooded condition. Under a partially flooded operating condition curve 406, $P_{3Inlet} > P_2 >> P_{3Outlet}$. Under the third operating curve 408, $P_{3Inlet} >> P_2 > P_{3Outlet}$, a greater amount of amount of flooding occurs.

Thus, in the embodiment of FIG. 5, the thresholds remain constant as the voltage remains constant. When applied to the method of FIG. 4, the query block 304 in this embodiment would determine the operating voltage of the fuel cell and fluid pressures, $P_{3Inlet} > P_2 >> P_{3Outlet}$, are varied in block 314 to maintain the voltage between the lower threshold 400 and the upper threshold 402.

It should be appreciated that while the operating curves 404, 406, 408 are represented as being linear, this is for exemplary purposes and the curves 404, 406, 408 may have a linear or nonlinear shape.

Figure 6:
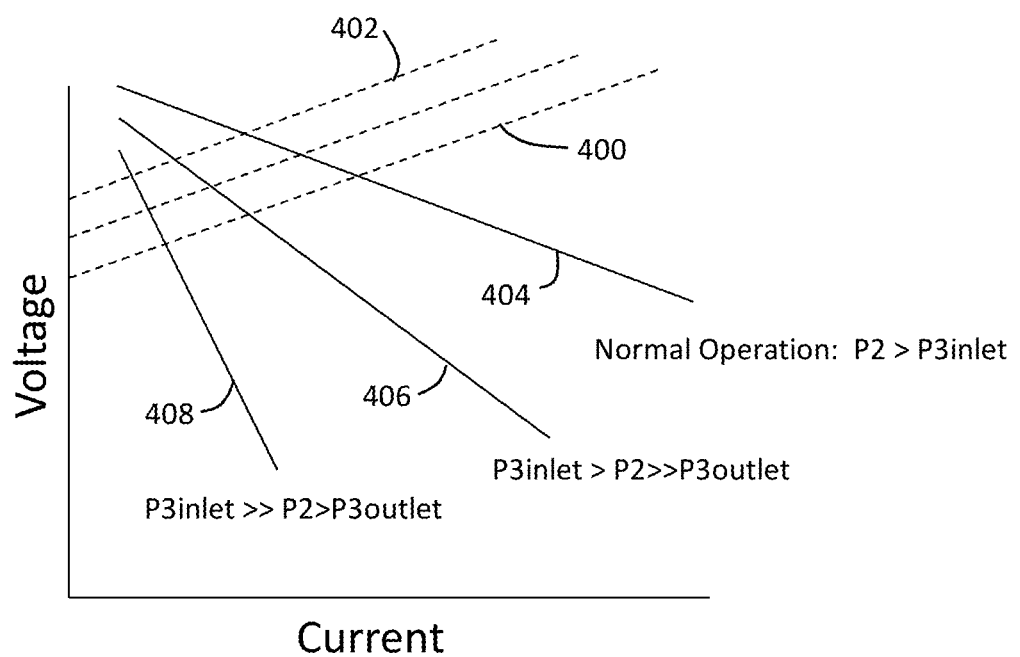

In still other embodiments shown in FIG. 6, the pressures, $P_{3Inlet} > P_2 >> P_{3Outlet}$, may be adjusted to maintain the voltage between the thresholds 400, 402 as a function of current. In this embodiment, the thresholds 400, 402 have a positive slope, meaning the threshold voltage increases as the current increases. This may provide advantages in allowing higher voltages at higher power output (with a corresponding higher current) to provide improved efficiency and less heat rejection while still providing lower voltage at lower-power/lower-current levels for improved durability and increased heat generation.

Figure 7:
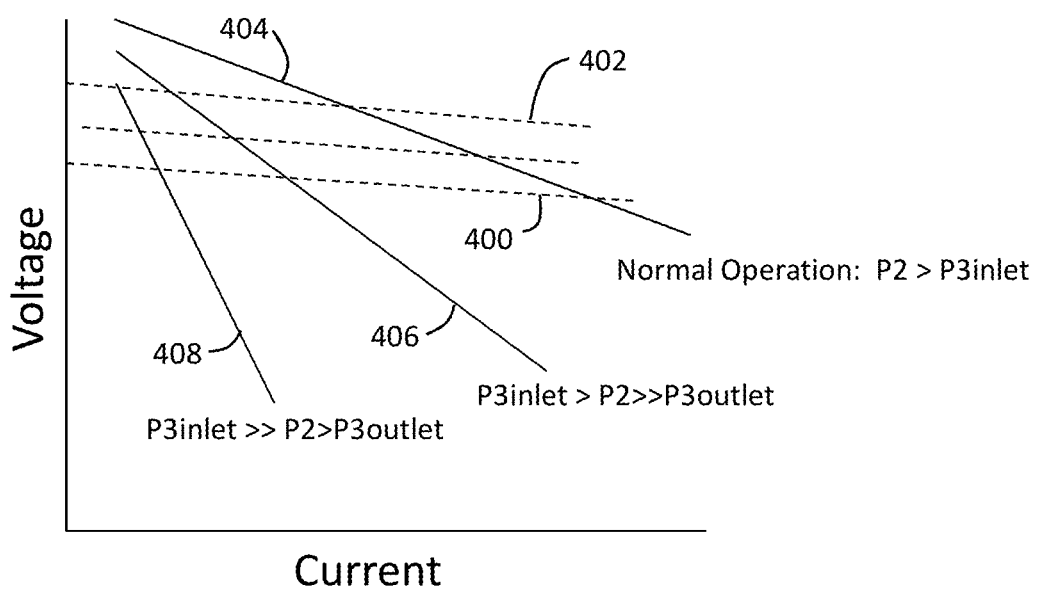

In still another embodiment shown in FIG. 7 where the pressures $P_{3Inlet} > P_2 >> P_{3Outlet}$, are once again adjusted to maintain the voltage between the thresholds 400, 402 as a function of current. In this embodiment, the slope of the thresholds 400, 402 have a negative slope, meaning the voltage threshold decreases as current increases. As a result, the voltage is allowed to increase slightly as the power/current decrease. This may provide advantages in increasing efficiency at lower power/current states of operation.

Accordingly, and as disclosed, some embodiments of the invention may include some of the advantage of adjusting the cell voltage of the electrochemical cell by selectively increasing the water level in the cathode of the cell to change the size of the electrode active area. By operating electrochemical cell at lower cell voltages under low electrical power operating conditions improvements may be made in the durability and reliability of the electrochemical cell.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of operating an electrochemical cell comprising:

determining one of a power level, current level or a voltage level of the electrochemical cell, the electrochemical cell including at least one cell having an anode side and a cathode side, the electrochemical cell further having a water transport plate operably coupled to the cathode side;

determining an oxidant pressure level in the cathode side;

determining a water pressure level in the water transport plate; and changing the active area of the at least one cell by partially flooding the cathode side and adjusting at least one of the oxidant pressure level or the water pressure level, the adjustment of the least one of the oxidant pressure level or the water pressure level is based at least in part on the determined power level, current level or voltage level.

2. The method of claim 1, further comprising determining an inlet water pressure to a channel of the water transport plate, and determining an oxidant inlet pressure on the cathode side.

3. The method of claim 2, further comprising adjusting at least one of the inlet water pressure or the oxidant inlet pressure, wherein the inlet water pressure is greater than or equal to the oxidant inlet pressure.

4. The method of claim 3, further comprising determining an outlet water pressure, and adjusting one of the inlet water pressure, the oxidant inlet pressure, or the oxidant outlet pressure, wherein the outlet water pressure is less than the oxidant inlet pressure.

5. The method of claim 1, further comprising determining a voltage of the at least one cell.

6. The method of claim 5, further comprising reducing the voltage of the at least one cell to be equal to or less than a threshold based on changing the active area.

7. The method of claim 6 wherein the threshold is 0.8 volts.

* * * * *